United States Patent [19]

Woo

[11] 4,079,023

[45] Mar. 14, 1978

[54] SULFUR FOAM PROCESS AND PRODUCT

[75] Inventor: Gar Lok Woo, Tiburon, Calif.

[73] Assignee: Chevron Research Company, San Francisco, Calif.

[21] Appl. No.: 758,738

[22] Filed: Jan. 12, 1977

[51] Int. Cl.$^2$ ............................................. C08J 9/00
[52] U.S. Cl. .................... 260/2.5 A; 260/2.5 AM; 260/2.5 N; 260/2.5 BE; 260/2.5 AK; 260/17.4 R; 260/42.18; 260/42.22; 260/42.24; 260/857 PE; 260/857 UN; 260/858; 260/859 R
[58] Field of Search ......... 260/2.5 A, 2.5 AM, 2.5 N, 260/2.5 R, 2.5 AP

[56] References Cited

U.S. PATENT DOCUMENTS

| 3,887,504 | 6/1975 | Woo | 260/2.5 A |
|---|---|---|---|
| 3,892,686 | 7/1975 | Woo | 260/2.5 R |
| 3,954,685 | 5/1976 | Woo | 260/2.5 R |
| 4,011,179 | 3/1977 | Woo et al. | 260/2.5 R |

Primary Examiner—Morton Foelak
Attorney, Agent, or Firm—D. A. Newell; John Stoner, Jr.; W. Keith Turner

[57] ABSTRACT

A process for making a sulfur foam containing at least 50 weight percent sulfur which comprises (a) contacting and reacting molten sulfur with a carboxylic acid which is reactive with the molten sulfur so as to incorporate the acid with the molten sulfur and form a molten sulfur-acid adduct containing carboxylic acid groups; (b) mixing the molten adduct with an alkali earth metal carbonate and a foam stabilizer such as talc or mica to obtain a mixture; and (c) reacting said mixture with phosphoric acid in the absence of any added phosphorus sulfide to obtain the foam. Preferably the molten sulfur is reacted with a plasticizer such as dicyclopentadiene before foaming with phosphoric acid.

17 Claims, No Drawings

SULFUR FOAM PROCESS AND PRODUCT

BACKGROUND OF THE INVENTION

The present invention relates to sulfur foams.

A recent patent issued to Dale and Ludwig, U.S. Pat. No. 3,337,355, discloses the production of a sulfur foam using the following steps:
(a) heating sulfur to above its melting point;
(b) blending a stabilizing agent with the molten sulfur;
(c) blending a viscosity increaser with the molten sulfur, steps (b) and (c) being taken in either order with respect to the other;
(d) forming bubbles in the molten sulfur; and
(e) cooling the molten sulfur to below its melting point.

Stabilizing agents disclosed include talcs, mica and plate-like particles. Viscosity increases disclosed include phosphorus sulfide, styrene monomers and polysulfide liquids. According to U.S. Pat. No. 3,337,355:

"The forming of bubbles in the molten sulphur may be done in any conventional manner for forming foams generally such as those methods used in forming plastic foams. These include (1) mechanically mixing a gas such as air with the molten sulphur, (2) adding a blowing agent, and (3) mixing a liquid with the molten sulphur while maintaining a predetermined pressure on the sulphur and then releasing the pressure on the sulphur sufficiently that the liquid will vaporize at the temperature and lower pressure involved. All of these methods must use material free from substance having a deleterious effect upon the process. For example, most members of the halogen family will decrease the viscosity of the sulphur sufficiently that proper foams will not be formed. Examples of blowing agents that are satisfactory are a combination of sodium carbonate or bicarbonate and acid, N,N'-dimethyl N,N'-dinitrosoterephthalamide sold under the trade name Nitrosan, sodium bicarbonate dispersed in a neutral oil sold under the trade name Unicel S, and N,N'-dinitrosopentamethylenetetramine sold under the trade name Unicel ND. Nitrosan, Unicel S, and Unicel ND are products of E. I. du Pont de Nemours & Co."

According to the examples in U.S. Pat. No. 3,337,355, typical ingredients for the sulfur foam include sulfur, talc, $P_2S_5$, calcium carbonate and phosphoric acid.

As described in a report by Dale and Ludwig, in foams which they made using phosphoric acid which might or might not contain calcium carbonate their "investigation showed that it was the $H_3PO_4$ reacting with the $P_2S_5$ that was producing the gases that acted as the blowing agent." See "Investigation of Light Weight Sulfur Foam for Use in Field Applications", John M. Dale and Allen C. Ludwig, October 1969, Cold Regions Research and Engineering Laboratory, Hanover, N.H., particularly pages 3 and 4. The reaction of $P_2S_5$ with $H_3PO_4$ yields a hydrogen sulfide blown foam.

Production of $CO_2$ blown sulfur foams using an organic acid and a polyisocyanate is disclosed in Gar Lok Woo U.S. Pat. Nos. 3,887,504 and 3,892,686.

SUMMARY OF THE INVENTION

According to the present invention a process is provided for making a sulfur foam containing at least 50 weight percent sulfur which comprises (a) contacting and reacting molten sulfur with a carboxylic acid which is reactive with the molten sulfur so as to incorporate the acid with the molten sulfur and form a molten sulfur-acid adduct containing carboxylic acid groups, (b) mixing the molten adduct with an alkaline earth metal carbonate and a stabilizer to obtain a mixture, and (c) reacting said mixture with phosphoric acid in the absence of any added phosphorus sulfide to obtain the foam.

Preferably the sulfur foam is produced from molten sulfur which has been plasticized by a plasticizer in addition to the plasticizing action which can be obtained from the carboxylic acid. Thus, according to a preferred embodiment of the present invention, a process is provided which comprises: (a) contacting and reacting molten sulfur with a plasticizer which is reactive with the molten sulfur so as to incorporate the plasticizer with the sulfur to thereby obtain a modified sulfur compound which is more plastic at a given temperature than is elemental sulfur; (b) contacting and reacting the molten modified sulfur with a carboxylic acid which is reactive with the modified sulfur so as to incorporate the acid with the modified sulfur and form a modified sulfur-acid adduct containing carboxylic acid groups; (c) mixing the molten adduct with an alkaline earth metal carbonate and a stabilizer such as talc or mica to obtain a mixture of the molten adduct and the carbonate; and (d) reacting said mixture with phosphoric acid in the absence of any added phosphorus sulfide to obtain the foam.

The term "foam" is used herein to mean a cellular material containing a gas in the cells. When initially formed, the foam may be finely divided gas bubbles in liquid, but after cooling the foam becomes a flexible or rigid solid containing gas bubbles.

The term "adduct" is used herein to connote formation of one or more chemical bonds between the sulfur and the carboxylic acid.

The term "stabilizer" is used to include particulate finely divided solid material, preferably talc or mica and most preferably talc, which functions to stabilize the foam against collapse. Further exemplary stabilizer solids are listed in U.S. Pat. No. 3,337,355.

The carboxylic acids used herein are limited to those reactive with molten sulfur to form a sulfur-organic acid adduct containing COOH groups (the COOH group being the protonic acid group). Preferred carboxylic acids for use herein have from 2 to 30 carbon atoms, more preferably 2 to 15 carbon atoms.

Particularly preferred carboxylic acids which can perform as functionally indicated above in the first paragraph under "Summary of the Invention" are unsaturated acids such as acrylic acid and acids containing a disulfide or polysulfide bond or a mercapto group, such as dithiodipropionic acid or 3-mercaptopropionic acid.

Exemplary acids include sulfur-containing acids such as dithiodipropionic acid, dithioglycolic acid, mercaptoacetic acid, 3-mercaptopropionic acid, 1,2-dithiane-3,6-carboxylic acid, 1,2-dithiolane-4-carboxylic acid, 6,8-thioetic acid, p-mercaptobenzoic acid, mercaptophenylacetic acid, etc.,; unsaturated monocarboxylic acids such as acrylic acid, oleic acid, methacrylic acid, monoesters of maleic or fumaric acid (methyl fumarate), monoallyl esters of dibasic acids (allyl succinate, allyl adipate), etc.; unsaturated polycarboxylic acids having at least 5 carbon atoms such as 2-pentene-1,5-dicarboxylic acid, 4-octene-1,8-dicarboxylic acid, 3-hexene-1,6-carboxylic acid, acid-esters formed by the reaction of an unsaturated dibasic or polybasic acid and a polyhydric alcohol or monoesters of a saturated polybasic acid and an unsaturated polyhydric alcohol (trimethylolpropanetrimaleate), etc.; and saturated acids which in the presence of molten sulfur are converted to sulfurized acids, such as palmitic acid, stearic acid, hexane carboxylic acid, various naphthenic acids, etc.

Monoolefinic carboxylic acids having from 3 to 30, preferably from 3 to 15, carbon atoms are especially preferred carboxylic acids for use in the present invention. In this connection, it can be noted that some saturated acids will be satisfactory for use in the present invention. For example, if a saturated acid such as hexadecanoic acid is heated with sulfur, hydrogen sulfide is evolved and the hexadecanoic acid is dehydrogenated to form an unsaturated acid, which is then further transformed into a sulfurized acid. Unsaturated acids are preferred reactive acids for forming the sulfur-acid adduct. The unsaturated acids are believed to react with the molten sulfur principally at the double (or triple) carbon-carbon bond. Dithio organic acids are believed to react with the molten sulfur at the sulfur-sulfur bond of the dithio acid. In any case, in accordance with the present invention, the organic acid must react with the sulfur to form a sulfur-organic acid adduct containing carboxylic acid groups.

Preferably the unsaturated dithio or mercapto acids used in the process of the present invention have from 2 to 30 carbon atoms. Particularly preferred organic acids for use in the process of the present invention include acrylic acid, dithiodipropionic acid, 3-mercaptopropionic acid, 2-mercaptobenzoic acid, methacrylic acid and mercaptoacetic acid.

The quantity of acid to be incorporated varies from 0.001 to 1.0, preferably 0.005 to 0.15, g-mol acid equivalents per 100 grams of sulfur.

Acrylic acid is an especially preferred acid for use in the process of the present invention. Preferred amounts of acrylic acid are from 0.2 to 15 weight percent, based on the molten sulfur. In general, preferred amounts of acrylic acid for use in the present invention are from 0.2 to 15, more preferably from 1 to 7, in weight percent, calculated as weight percent of the sulfur. It should be recognized that higher quantities of acid may be reacted with sulfur to form the adduct, and then this adduct can be diluted with sulfur to give a final acid concentration within the above ranges.

In an optional but preferred method of carrying out the process of the present invention, the sulfur is plasticized by the addition of about 1 to 99, preferably 1 to 50, parts of a plasticizer per 100 parts of sulfur. Preferably after plasticization is complete, the organic acid is added to form the sulfur-acid adduct using the plasticized sulfur, and the process is continued as before. In another embodiment, the plasticizer can be added to the sulfur-acid mixture. The acid and pasticizer can also be added to the sulfur simultaneously. Plasticizers are useful to reduce cracking, especially surface cracking as occurs with some uplasticized sulfur foam. The acid ingredient itself is sometimes a sufficient plasticizer, particularly the olefinically unsaturated acids, but at other times extra, nonacidic plasticizers are needed or at least are advantageous in producing a good sulfur foam. Plasticizers are well known in the sulfur art (see Alberta Sulfur Research, Ltd., Quarterly Bulletin, Vol. VIII, No. 4, January-March 1972), and frequently include compounds having one or more sulfur atoms in the molecule.

Plasticized sulfur usually has a lower melting point and a higher viscosity than elemental sulfur. Furthermore, plasticized sulfur requires a longer time to crystallize; i.e., the rate of crystallization of plasticized sulfur is slower than that of elemental sulfur. One useful way to measure the rate of crystallization is as follows: the test material (0.040 g) is melted on a microscope slide at 130° C and is then covered with a square microscope slide cover slip. The slide is transferred to a hot plate and is kept at a temperature of 78°±2° C, as measured on the glass slide using a surface pyrometer. One corner of the melt is seeded with a crystal of test material. The time required for complete crystallization is measured. Plasticized sulfur, then, is sulfur containing an additive which increases the crystallization time within experimental error, i.e., the average crystallization time of the plasticized sulfur is greater than the average crystallization time of the elemental sulfur feedstock. For the present application, plasticizers are those substances which, when added to molten elemental sulfur, cause an increase in crystallization time in reference to the elemental sulfur itself. In one set of experiments, elemental sulfur required 0.44 minute to crystallize under the above conditions, whereas sulfur containing 3.8% of a phenol-sulfur adduct (as described in U.S. Pat. No. 3,892,686) required 2.9 minutes. Sulfur containing 6.6% and 9.9% of the same phenol-sulfur adduct required 5.7 and 22 minutes, respectively.

The preferred plasticizers are organic compounds which can react with sulfur to give sulfur-containing materials such as styrene, alpha methylstyrene, dicyclopentadiene, vinyl cyclohexene, the aromatic compound-sulfur adducts of U.S. Pat. No. 3,892,686, as well as the aromatic compounds used to produce these adducts, liquid polysulfides (e.g., those sold under the trade name of Thickol IP-3 or LP-32), and the viscosity control agents described in U.S. Pat. Nos. 3,674,525, 3,453,125 and 3,676,166. The preferred aromatic plasticizing compounds are styrene and the phenol-sulfur adduct of U.S. Pat. No. 3,892,686. The preferred aliphatic compound is dicyclopentadiene.

The quantity of plasticizer to be added varies with the nature of the plasticizer, but usually is in the range 0.5 to 40 weight percent based on the final composition. Styrene, for example, is preferably used at the 1- to 10-weight-percent level, whereas polyunsaturated olefins such as dicyclopentadiene are preferably used at the 1- to 5-weight-percent level. The upper limit on plasticizer concentration is determined by the viscosity and the melting or softening point of the resulting plasticized sulfur. Final viscosity must be such that the composition will flow at the desired temperature and will also be able to be mixed with the acid. The material should not be over-plasticized to cause foam collapse or to shrink excessively on cooling.

Solid stabilizers include finely divided, inert material having individual particles which are plate-like in form. Examples include talc, mica, carbon black, aluminum pigment, kaolin, etc. This ingredient is usually added to the molten-sulfur mixture before the inorganic acid such as phosphoric acid is added. The quantity of stabilizer varies from 1 to 15 parts per 100 parts of sulfur.

In addition to, or in place of, the previously described additives, in certain applications it is desirable to add to the foam compositions other nonplate-like materials, typically those which have been employed as fillers in plastic foams. Materials of this type are described in "Plastic Foams," Vol. I, Calvin James Banning, Wiley-Interscience, 1969. Examples of such fillers include wood-derived materials such as wood flour, resins, and synthetic fibers such as nylon, acrylics and polyesters, inorganic salts and oxides such as heavy metal oxides to modify electrical properties, silica and various silicates, etc. Another group of materials which can be used to modify physical properties of the foams are the inorganic flakes and fibers represented by glass fiber, mica and asbestos fillers, etc. Such fillers are employed at concentrations in the range of about 1 to 15 parts per 100 parts of sulfur, depending on the vicosity or thixotropic property of the final material.

Preferred carbonates for use in the process of the present invention are alkaline earth metal carbonates of Group II of the Periodic Table, and particularly preferred carbonates are magnesium and calcium carbonate, with calcium carbonate being the most preferred. The amounts of the carbonates used in preparing the sulfur foam herein are preferably between 0.1 and 20 weight percent, more preferably between 0.5 and 5 weight percent, based on the entire mixture.

The acid reacted with the mixture of the carbonate and molten sulfur-carboxylic acid adduct is preferably an inorgance acid effective to release $CO_2$ from the carbonate upon such reaction. Alternatively, an organic acid such as an organic sulfonic acid, or organic phosphorus acids, can be used. Preferably the acid used is phosphoric acid. The preferred amount of phosphoric acid used is between 0.1 to 10 weight percent based on the final composition, and more preferably between 0.5 to 5%. If other acids are to be used, the preferred amount is equal to the preferred equivalent based on phosphoric acid.

Preferred inorganic particulate fillers which are included with the molten adduct and carbonate prior to the reaction of the mixture with phosphoric acid include talc or glass fibers or mixtures thereof. The carbonates can also be used as a filler.

In accordance with a preferred embodiment of the present invention, a process is provided for making a sulfur foam containing at least 50 weight percent sulfur which comprises: (a) contacting and reacting molten sulfur with dicyclopentadiene at a temperature between 115° and 160° C so as to incorporate the dicyclopentadiene with sulfur to thereby obtain a modified sulfur compound which is more plastic at a given temperature than is elemental sulfur; (b) contacting and reacting molten modified sulfur with acrylic acid at a temperature between 115° and 160° C so as to incorporate the acid with the molten modified sulfur and form a molten modified sulfur-acrylic acid adduct containing carboxylic acid groups; (c) mixing the molten adduct with calcium carbonate and a stabilizer to obtain a mixture of the molten adduct and the carbonate; and (d) reacting said mixture with phosphoric acid in the absence of any added phosphorus sulfide to obtain the foam. The acid can be added simultaneously with the dicyclopentadiene.

Preferred amounts of the respective constituents in the above preferred embodiment are dicyclopentadiene plasticizer in the range 0.5 to 5 weight percent based on the final foam, acrylic acid in the range 0.2 to 15 weight percent based on the molten sulfur, calcium carbonate in the range 0.5 to 5 weight percent based on the entire mixture, and phosphoric acid in the range 0.5 to 5 weight percent based on the entire composition.

The present invention is directed to sulfur foam products produced by any of the processes of the present invention. The sulfur foam products of the process as described above are advantageously used in applications such as insulation and as building materials.

The sulfur foam products of the present invention are produced using steps as described above wherein reactions are carried out at temperatures such that the sulfur or plasticized sulfur is in the liquid state. In general, temperatures in the range 110° to 180° C are satisfactory for reacting sulfur, the plasticizer and the carboxylic acid; however, the preferred range is 115° to 160° C, more preferably 120°–150° C. The preferred foaming temperature is 100°–150° C and more preferably 110°–130° C. The final sulfur foam product is typically obtained by cooling to below molten-sulfur temperature, usually approximately ambient temperature.

EXAMPLES

Example 1 — Preparation of Sulfur Foam Using Dicyclopentadiene as Modifier

1(a) To 1952 g of molten sulfur at 145° C, with stirring, was added 48 g of dicyclopentadiene, which was reacted for 1 hour at 145°–150° C. The mixture was cooled to 120° C and used for preparation of foam.

1(b) A foam was prepared with 200 g of Example 1(a) product at 118° C. 5.1 g of calcium carbonate powder and 11 g of talc (MISTRON VAPOR talc) was added and mixed briefly with a 3500-rpm drill motor equipped with a 1.75 inch propeller. The mixture was cooled to 118° C and 2 cc of phosphoric acid (86%) was added and stirred with the drill. The mixture was immediately poured into a mold. The foamed product had coarse cells with a cavity in the center and a density of 38 lb/ft$^3$.

1(c) A foam was prepared with 200 g of product of Example 1(a) in the same manner as Example 1(b) using 11 g of talc (International Fiber No. 1 talc) and 5 g of milled glass (Owens-Corning 630¼ inch). The foamed product had large nonuniform cells with large cavities and a density of 29 lb/ft$^3$.

1(d) A foam was prepared with 200 g of product of Example 1(a) in the same manner as Example 1(b) using 11 g of talc (International Fiber No. 1). The foamed product had large honeycomb-like cells with large cavities in the center and a density of 15 lb/ft$^3$.

Example 2 — Preparation of Sulfur Foam Using Dicyclopentadiene and Acrylic Acid as Modifiers 2(a) A mixture of 72 g of dicyclopentadiene and 44 g of glacial acrylic acid was added dropwise with stirring in 30 minutes to 3000 g of molten sulfur at 145°–150° C. The mixture was reacted for 4 hours at 145°–150°C. The foam precursor was allowed to cool to ambient temperature for later use.

2(b) A foam was prepared from 200 g of Example 2(a) product in the same manner as Example 1(b). The foam product had fine uniform cells with no cavities and a density of 40 lb/ft$^3$.

2(c) A foam was made from 200 g of Example 2(a) product in the same manner as Example 1(b) using 11 g of talc (International Fiber No. 1 talc) and 5 g of milled glass (Owens-Corning 630¼ inch). The foamed product obtained had large honeycomb-like cells with cavities and a density of 39 lb/ft$^3$.

2(d) A foam was prepared from 200 g of product of Example 2(a) in the same manner as Example 1(b) using 11 g of talc (International Fiber No. 1 talc). The foamed product had coarse honeycomb-like cells with a cavity in the center and a density of 32 lb/ft$^3$.

What is claimed is:

1. A process for making a sulfur foam containing at least 50 weight percent sulfur which comprises:
    (a) contacting and reacting molten sulfur with a carboxylic acid which is reactive with the molten sulfur so as to incorporate the acid with the molten sulfur and form a molten sulfur-acid adduct containing carboxylic acid groups;
    (b) mixing the molten adduct with an alkaline earth metal carbonate and a foam stabilizer to obtain a mixture; and
    (c) reacting said mixture with phosphoric acid in the absence of any added phosphorus sulfide to obtain the foam.

2. A process for making a sulfur foam containing at least 50 weight percent sulfur which comprises:
    (a) contacting and reacting molten sulfur with a plasticizer which is reactive with the molten sulfur so as to incorporate the plasticizer with the sulfur to thereby obtain a modified sulfur compound which is more plastic at a given temperature than is elemental sulfur;
    (b) contacting and reacting the molten modified sulfur with a carboxylic acid which is reactive with the modified sulfur so as to incorporate the acid with the modified sulfur and form a modified sulfur-acid adduct containing carboxylic acid groups;
    (c) mixing the molten adduct with an alkaline earth metal carbonate and a foam stabilizer to obtain a mixture; and
    (d) reacting said mixture with phosphoric acid in the absence of any added phosphorus sulfide to obtain the foam.

3. A process in accordance with claim 2 wherein the acid is an olefinically unsaturated acid, a dithio acid, or a mercapto acid.

4. A process in accordance with claim 2 wherein the acid is an unsaturated aliphatic carboxylic acid containing from 3 to 30 carbon atoms and the stabilizer is talc or mica.

5. A process in accordance with claim 2 wherein the acid is acrylic acid.

6. A process in accordance with claim 2 wherein the carbonate is calcium carbonate.

7. A process in accordance with claim 2 wherein the plasticizer is an aromatic compound.

8. A process in accordance with claim 7 wherein the aromatic compound is styrene or phenol.

9. A process in accordance with claim 2 wherein the plasticizer is dicyclopentadiene.

10. A process in accordance with claim 2 wherein the inorganic particulate filler is mixed with the molten adduct prior to reacting the molten adduct-carbonate mixture with phosphoric acid.

11. A process in accordance with claim 2 wherein the reaction of the plasticizer with the sulfur and the reaction of the modified sulfur with the carboxylic acid are carried out at temperatures within the range 115° to 160° C.

12. A process for making a sulfur foam containing at least 50 weight percent sulfur which comprises:
    (a) contacting and reacting molten sulfur with dicyclopentadiene at a temperature between 115° and 160° C so as to incorporate the dicyclopentadiene with sulfur to thereby obtain a modified sulfur compound which is more plastic at a given temperature than is elemental sulfur;
    (b) contacting and reacting molten modified sulfur with acrylic acid at a temperature between 115° and 160° C so as to incorporate the acid with the molten modified sulfur and form a molten modified sulfur-acrylic acid adduct containing carboxylic acid groups;
    (c) mixing the molten adduct with calcium carbonate to obtain a mixture of the molten adduct and the carbonate; and
    (d) reacting said mixture with phosphoric acid in the absence of any added phosphorus sulfide to obtain the foam.

13. A process in accordance with claim 12 wherein the amount of dicyclopentadiene plasticizer used is in the range 0.5 to 40 weight percent based on the final foam, the amount of acrylic acid is 0.2 to 15 weight percent based on the molten sulfur, the amount of calcium carbonate is 0.5 to 5.0 weight percent based on the entire mixture, and the amount of phosphoric acid is 0.5 to 5.0 weight percent based on the entire mixture.

14. The product produced by the process of claim 1.
15. The product produced by the process of claim 2.
16. The product produced by the process of claim 5.
17. The product produced by the process of claim 13.

* * * * *